United States Patent

(12) United States Patent
Jou

(10) Patent No.: US 6,202,995 B1
(45) Date of Patent: Mar. 20, 2001

(54) SHOCK ABSORBING ELASTIC BLOCK AND SHOCK ABSORBER USING THE SAME

(75) Inventor: Long-Wen Jou, Taichung Hsien (TW)

(73) Assignee: Perfection Mighty Industrial Co., Ltd., Taichung Hsien (TW)

(*) Notice: Subject to any disclaimer, the term of this patent is extended or adjusted under 35 U.S.C. 154(b) by 0 days.

(21) Appl. No.: 09/344,970

(22) Filed: Jun. 29, 1999

(51) Int. Cl.$^7$ ............................................. B60G 11/22
(52) U.S. Cl. ..................... 267/293; 267/153; 267/140; 267/141; 267/276; 267/258
(58) Field of Search ..................... 280/276; 267/153, 267/292, 293, 294, 141.1, 141.2, 141.3, 141.4

(56) References Cited

U.S. PATENT DOCUMENTS

| | | | |
|---|---|---|---|
| 3,376,031 | * | 4/1968 | Lee ............................................. 267/1 |
| 3,806,106 | * | 4/1974 | Hamel et al. ........................ 267/152 |
| 3,892,398 | * | 7/1975 | Marsh .................................. 267/153 |
| 4,005,858 | * | 2/1977 | Lochner .............................. 267/136 |
| 4,354,397 | * | 10/1982 | Fix ........................................ 74/108 |
| 4,475,722 | * | 10/1984 | Paton et al. .............................. 267/9 |
| 4,592,030 | * | 5/1986 | Antkowiak ........................... 188/268 |
| 5,118,086 | * | 6/1992 | Stevenson et al. .................... 267/70 |
| 5,141,697 | * | 8/1992 | Wydra .................................. 264/320 |
| 5,193,833 | * | 3/1993 | Reisinger ............................. 280/276 |
| 5,429,344 | * | 7/1995 | Stewart ................................ 267/292 |
| 5,460,357 | * | 10/1995 | Stewart ................................ 267/294 |
| 5,529,327 | * | 6/1996 | Huang ................................. 280/276 |
| 5,597,169 | * | 1/1997 | Bradbury ............................. 280/276 |
| 5,868,384 | * | 2/1999 | Anderson ........................... 267/141.1 |

* cited by examiner

*Primary Examiner*—Robert J. Oberleitner
*Assistant Examiner*—Ben Pezzlo
(74) *Attorney, Agent, or Firm*—Ladas & Parry

(57) ABSTRACT

A shock absorber includes an outer tube, an inner tube having a proximal end sleeved slidably into the outer tube and a distal end extending away from the outer tube, a shaft disposed inside the inner tube, a plurality of shock absorbing elastic blocks which are mounted on the outer tube for positioning resiliently the distal end away from the outer tube and which are sleeved around the shaft inside the inner tube without contacting the inner tube, each block having an inner tubular part sleeved around the shaft, and an outer tubular part wrapped around the inner tubular part. The inner and outer tubular parts are made of rubber materials having different degrees of stiffness. The inner tubular part has a stiffness higher than that of the inner tubular part to resist and limit impact pressure acting on the outer tubular part, thereby reducing deformation of the outer tubular part along radial directions and preventing the blocks from contacting the inner tube upon shock.

2 Claims, 4 Drawing Sheets

SHOCK ABSORBING ELASTIC BLOCK AND SHOCK ABSORBER USING THE SAME

BACKGROUND OF THE INVENTION

1. Field of the Invention

The present invention relates to a shock absorbing block, more particularly to a shock absorbing block which provides an excellent shock-absorbing effect and which has a prolonged service life.

2. Description of the Related Art

FIGS. 1 and 2 illustrate a conventional shock absorbing elastic block 13 and a shock absorber 10 incorporating a plurality of the blocks 13. The shock absorber is generally mounted on a front fork (not shown) of a bicycle frame for absorbing shock acting on the front wheel of the bicycle. As shown, the blocks 13 are sleeved on a shaft 12, and are disposed inside a tube 11 to form the shock absorber 10. The shock absorbing elastic blocks 13 are made integrally from a single rubber material. When a compression force (F) is applied to the shock absorber 10 along two opposite axial directions, an intermediate section of each of the elastic blocks 13 produces larger deformation along radial directions relative to two end portions of the elastic block 13 such that an outer peripheral face of the block 13 at the intermediate section is in frictional contact with the tube 11. Thus, the shock absorbing elastic blocks 13 easily wear out, which necessitates frequent replacement of the blocks 13. In addition, since the blocks 13 abut against an inner surface of the tube 11 after deformation, sliding movement of the blocks 13 with respect to the tube 11 is retarded. The conventional shock absorbing effect achieved by the shock absorber 10 is thus reduced.

SUMMARY OF THE INVENTION

Therefore, the main object of the present invention is to provide an improved shock absorbing elastic block that overcomes the aforesaid disadvantages.

According to one aspect of the invention, a shock absorbing elastic block, which is adapted to be sleeved around a shaft inside a tube to form a shock-absorber, includes inner and outer tubular parts. The inner tubular part is made from a first rubber material and adapted to be sleeved around the shaft. An outer tubular part is wrapped around the inner tubular part and is made from a second rubber material which has a degree of stiffness lower than that of the first rubber material. A flexible plastic wrapping is disposed around the outer tubular part. The inner tubular part has a plurality of indentations spaced apart axially and extending thereabout substantially along circumferential directions. The outer tubular part has complementary protrusions mating with the indentations.

According to another aspect of the invention, a shock absorber comprises an outer tube; an inner tube connected telescopically to the outer tube, the inner tube having a proximal end sleeved into the outer tube and a distal end extending away from the outer tube; a shaft disposed inside the inner tube and connected integrally to the distal end of the inner tube for simultaneous movement; and a plurality of shock absorbing elastic blocks which are mounted on the outer tube for positioning resiliently the distal end away from the outer tube and which are sleeved around the shaft inside the inner tube without contacting the inner tube, each of the blocks having an inner tubular part sleeved around the shaft, and an outer tubular part wrapped around the inner tubular part, the inner and outer tubular parts being made of rubber materials having different degrees of stiffness, the inner tubular part having a stiffness higher than that of the outer tubular part to resist and limit impact pressure on the outer tubular part, thereby reducing deformation of the outer tubular part along radial directions and preventing the blocks from contacting the inner tube upon shock.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
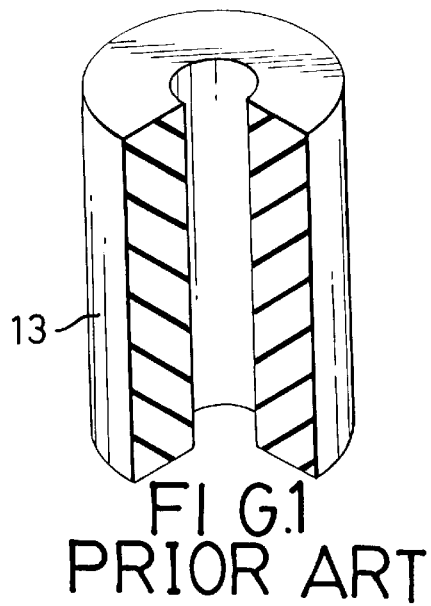
FIG. 1 is a partly sectional perspective view of a conventional shock absorbing elastic block for use in a shock absorber.
Figure 2:
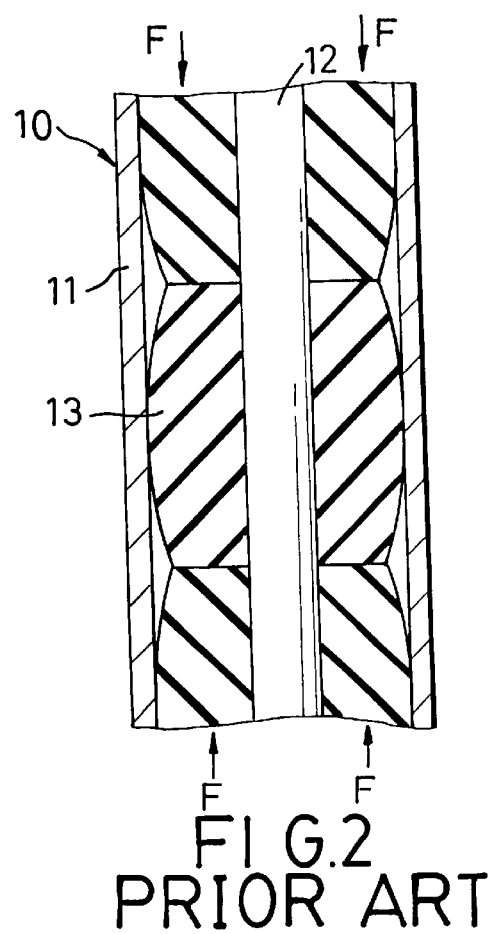
FIG. 2 is a fragmentary sectional view of a conventional shock absorber incorporating a plurality of the shock absorbing elastic blocks of FIG. 1.
Figure 3:
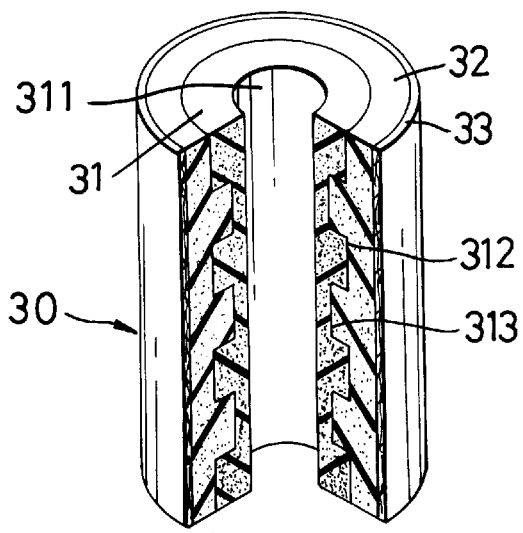
FIG. 3 is a partly sectional perspective view of a shock absorbing elastic block of a first preferred embodiment according to the present invention.
Figure 4:
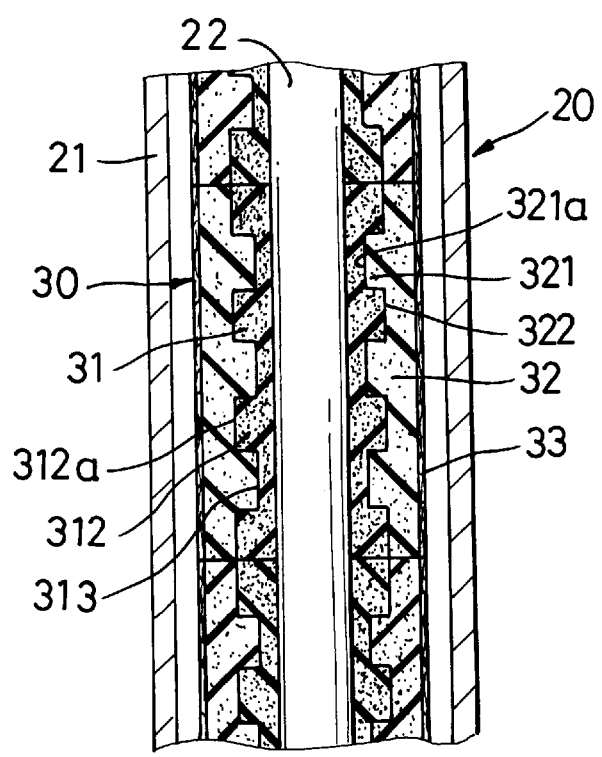
FIG. 4 is a fragmentary sectional view of a shock absorber incorporating a plurality of the shock absorbing elastic blocks of FIG. 3.

Referring to FIGS. 3 and 4, the first preferred embodiment of the shock absorbing elastic block 30 of the present invention is shown to include an inner tubular part 31, an outer tubular part 32, and a flexible plastic wrapping 33.

The inner tubular part 31 is formed from a high density foamed rubber material having a high degree of stiffness, such as polyurethane. The inner tubular part 31 has an inner peripheral face that confines an axial hole 311, and an outer peripheral face formed with a plurality of peripheral flanges 312 and indentations 313 formed among adjacent peripheral flanges 312. The peripheral flanges 312 and the indentations 313 extend around the outer peripheral face of the inner tubular part 31. Each indentation 313 has a U-shaped cross-section.

The outer tubular part 32 is connected integrally to and sleeved coaxially on the inner tubular part 31. The outer tubular part 32 is formed from a low density polyurethane foam, which has a degree of stiffness that is lower than that of the inner tubular part 31. The outer tubular part 32 has an inner peripheral face formed with a plurality of complementary protrusions 321 mating with the indentations 313 in the inner tubular part 31, and a plurality of grooves 322 formed among adjacent protrusions 321 for receiving the peripheral flanges 312 of the inner tubular part 31.

The plastic wrapping 33 is wrapped around the outer tubular part 32, and is formed from a plastic material, preferably incorporating fibers such as carbon fibers or and boron fibers.

Figure 6:
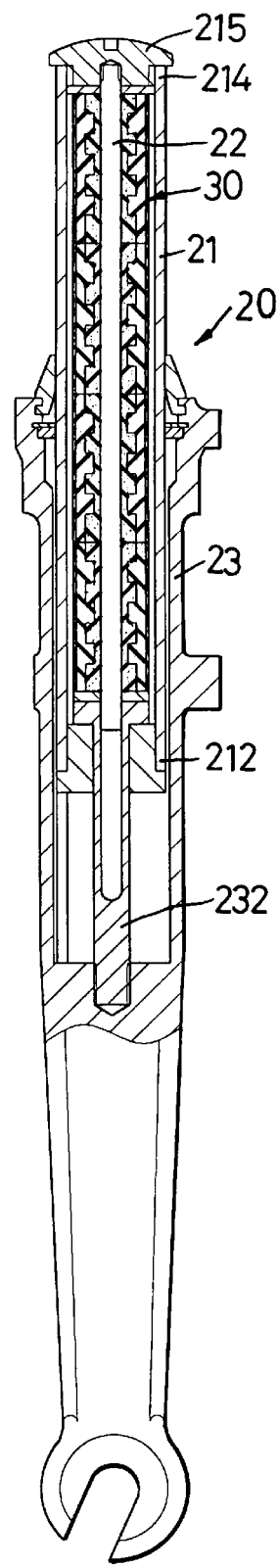
FIG. 6 is a sectional view illustrating a shock absorber of the first preferred embodiment of the present invention.

Referring to FIGS. 4 and 6, in use, a plurality of the shock absorbing elastic blocks 30 are sleeved on a shaft 22 inside an inner tube 21 which is connected telescopically to an outer tube 23 to form a shock absorber 20 that is adapted to be mounted on a front fork of a bicycle frame (not shown). As shown, the inner sleeve 21 has a proximal end 212 extending into the outer tube 23, and a distal end 214 extending away from the outer tube 23 and provided with a plug 215. The shaft 22 is connected integrally to the plug 215 for simultaneous movement with the inner tube 21. The elastic blocks 30 are supported by a support rod 232 extending upward from the outer tube 23 into the inner tube 21. A bottom end of the shaft 22 is slidably inserted into the support rod 232.

Figure 5:
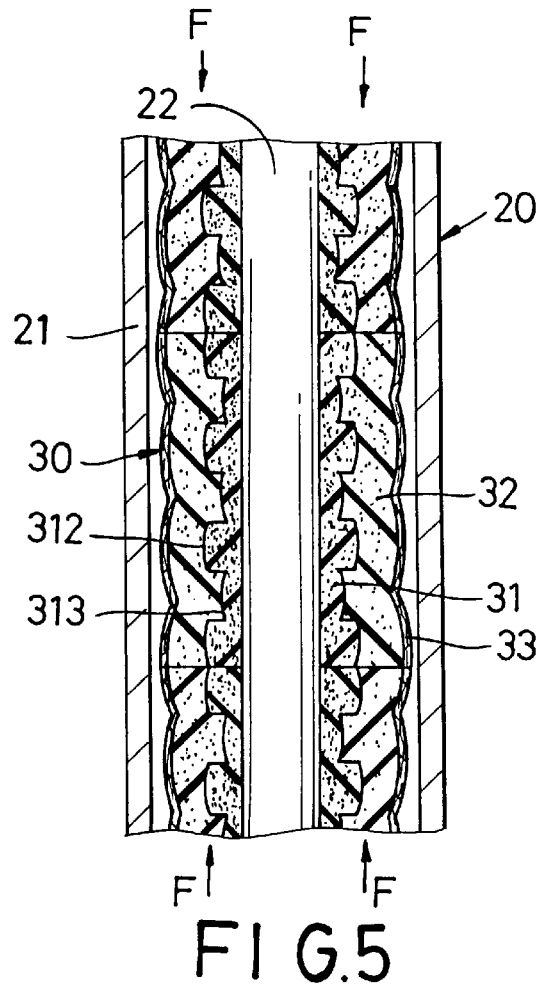
FIG. 5 is another fragmentary sectional view of the shock absorber of FIG. 4 in a compressed state upon impact.
Figure 7:
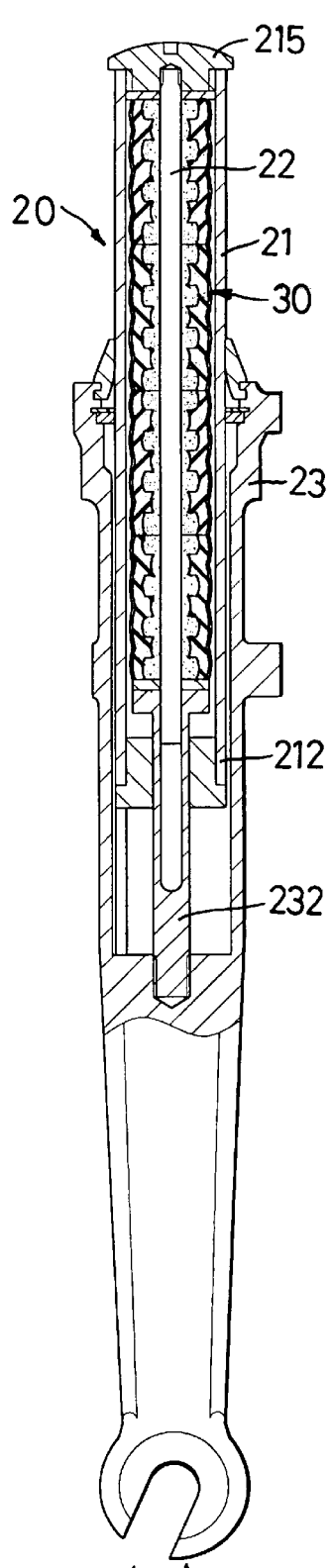
FIG. 7 is a sectional view illustrating a shock absorber of the first preferred embodiment in a compressed state upon impact.

As shown in FIGS. 5 and 7, when there is an impact on the shock absorber 20, the inner tubular part 31 bears most of the impact force due to its high stiffness so that the force of impact is limited from acting too much on the outer tubular part 32. As the cross-section of the inner tubular part 31 is reduced at the indentations 313, the inner tubular part 31 can deform more at the indentations 313 than at the flange 312 despite the high stiffness of the inner tubular part 31, and the occurrence of more deformation is confined within the indentations 313, thereby reducing expansion of the inner tubular part 31 along outward and radial directions. The extent of the deformation of the outer tubular part 32, which has a lower stiffness, is not large because of the lesser impact force acting thereon. Due to the aforesaid reasons, the deformation of the block 30, which has the inner and outer tubular parts 31, 32, along radial directions, is reduced as compared to the conventional shock absorbing block which is fabricated from a single rubber material. The block 30 is thus prevented from contacting or frictioning the inner tube 21.

Figure 8:
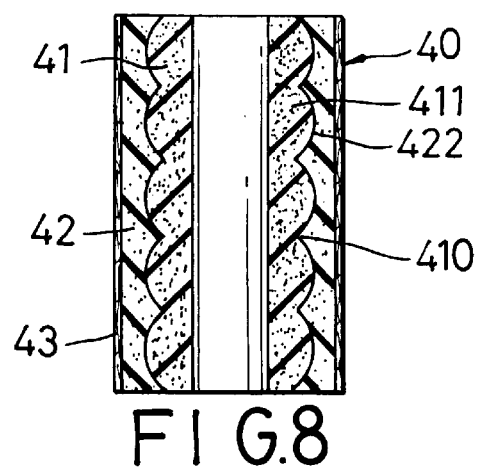
FIG. 8 is a sectional view of a shock absorbing block of a second preferred embodiment according to the present invention.

Referring to FIG. 8, the shock absorbing elastic block 40 of a second preferred embodiment according to the present invention is shown to include inner and outer tubular parts 41, 42, and a flexible wrapping 43 sleeved on the outer tubular part 42. The shock absorbing elastic block 40 is different from the shock absorbing elastic block 30 of the previous embodiment in that indentations 410 formed in the inner tubular part 41 have a V-shaped cross-section and that there are convex circumferential surface parts 411 each of which is arched outward from one of each pair of adjacent indentations 410 and indented to the other one of the two adjacent indentations 410.

Each of the grooves 422 formed in the inner peripheral face of the outer tubular part 42 has a concave face complementing the respective part 411 for fittingly receiving the same. When there is an impact on the elastic block 40 along two opposite axial directions, compression force can be distributed uniformly to the parts 411 and the grooves 422 to prevent a significant radial deformation at an intermediate section.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A shock absorbing elastic block adapted to be sleeved around a shaft inside a tube of a shock-absorber, said shock absorbing elastic block comprising:

an inner tubular part made from a first rubber material and adapted to be sleeved around the shaft;

an outer tubular part wrapped around said inner tubular part and made from a second rubber material which has a degree of stiffness lower than that of the first rubber material; and a flexible plastic wrapping disposed around said outer tubular part;

an inner tubular part having a plurality of indentations formed on said outer cylindrical face thereof and having a substantially U-shaped cross-section, said plurality of indentations of said inner tubular part, spaced apart axially and extending thereabout substantially along circumferential directions, said outer tubular part having complementary protrusions mating with said indentations.

2. A shock absorbing elastic block adapted to be sleeved around a shaft inside a tube of a shock absorber, said shock absorbing elastic block comprising:

an inner tubular part made from a first rubber material and adapted to be sleeved around the shaft;

an outer tubular part wrapped around said inner tubular part and made from a second rubber material which has a degree of stiffness lower than that of the first rubber material; and a flexible plastic wrapping disposed around said outer tubular part;

said inner tubular part having a plurality of indentations each having a substantially V-shaped cross section, said indentations spaced apart axially and extending thereabout substantially along circumferential directions, said inner tubular part having a plurality of convex circumferential surface parts each of which is arched outward from one of two adjacent ones of said indentations and indented to the other one of said two adjacent ones of said indentations, said outer tubular part having complementary protrusions mating with said indentations.

* * * * *